Aug. 21, 1923.
W. J. FRANK
WELDING TORCH
Filed March 1, 1922
1,465,390
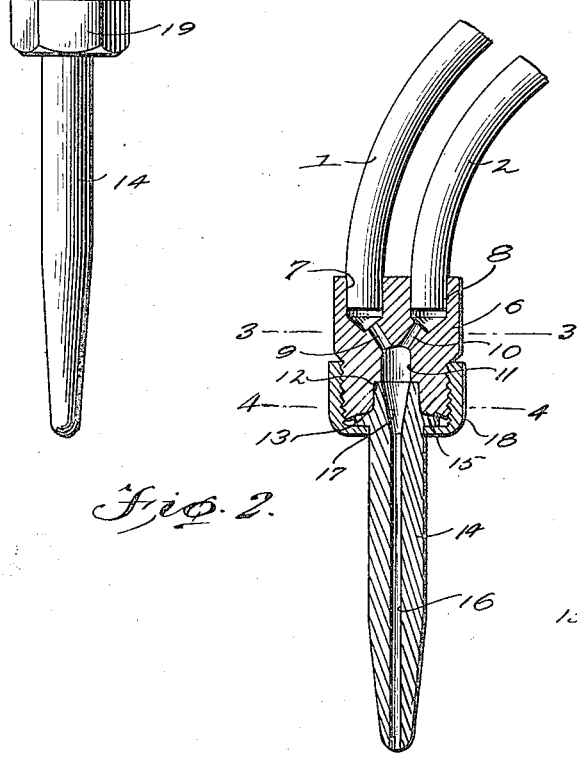
INVENTOR
W. J. Frank,
BY
ATTORNEYS Patented Aug. 21, 1923.

1,465,390

UNITED STATES PATENT OFFICE.

WILLIAM JOSEPH FRANK, OF BALTIMORE, MARYLAND.

WELDING TORCH.

Application filed March 1, 1922. Serial No. 540,135.

*To all whom it may concern:*

Be it known that I, WILLIAM JOSEPH FRANK, a citizen of the United States, and a resident of Baltimore, in the State of Maryland, have invented certain new and useful Improvements in Welding Torches, of which the following is a specification.

My invention relates to torches for use in welding metal, and it consists in the combinations, constructions and arrangements herein described and claimed.

An object of my invention is to provide a welding torch of simple construction which will permit of the use of a plurality of tips selectively, whereby the torch can be readily adapted by tip selection for use in welding operations ordinarily requiring the employment of a welding torch designed for either heavy or light work, according to the particular service requirements.

A further object of my invention is to provide a torch of the character described which is constructed in such a manner as to preclude the possibility of retardation of flow of a fluid fuel employed on account of sharp turns or projections in a passage through the torch for the fluid.

A further object of my invention is to provide in a torch of the character described, a one-piece tip of novel construction.

A still further object of my invention is to provide a torch which is light in weight, not likely to get out of order easily, and thoroughly effective for the purpose intended.

Other objects and advantages will appear in the following specification, and the novel features of the invention will be outlined in the appended claims.

My invention is illustrated in the accompanying drawings, forming a part of this specification, in which—

Fig. 1 is a plan view of my improved torch,

Fig. 2 is a simple view of a fragmentary portion of the torch, the head and tip thereof being shown in section, Fig. 3 is a section along the line 3—3 of Fig. 2, and Fig. 4 is a section along the line 4—4 of Fig. 2.

Referring now to the drawings, in which like reference numerals are employed to designate like parts throughout the several views, the numerals 1 and 2 denote delivery tubes extending through a handle 3 and maintained in spaced apart parallel relation by their engagement with the handle. Each of the delivery tubes 1 and 2 is fashioned at its rear end for connection with a hose, such as indicated at 4, and each is controlled by a valve 5 associated therewith adjacent to its rear end. The valves 5 may be of any suitable known type of construction and in consequence have been shown diagrammatically in the drawings.

The tubes 1 and 2 extend in parallel relation in advance of the handle 3 and are symmetrically curved or bent adjacent to their forward ends, as shown in the drawings, whereby the forward ends of the tubes 1 and 2 are flush with each other.

A head 6 is provided with spaced-apart sockets 7 and 8 in its rearward end, in which the forward ends of the tubes 1 and 2 respectively, are received and permanently secured, as by brazing. Ducts 9 and 10 lead from the bottoms of the sockets 7 and 8, respectively, to a central chamber 11. The chamber 11 has a counterbore 12 formed to provide a bell mouth 13 opening through the front end of the head.

A tip 14, which is formed in one piece, is enlarged externally adjacent to its rearward end, as at 15, and the end walls of the enlarged portion are formed to closely fit within the bell mouth 13 and the counterbore 12 of the head. The tip 14 tapers at its forward end and is provided with an axial passage 16 enlarged adjacent to the rearward end of the tip to provide a conoidal chamber 17 adapted to register with the chamber 11 in the confronting end of the head when the enlarged portion of the tip is seated in the bell mouthed counterbore of the head. A coupling nut 18 threadedly engages the head 6 and holds the tip 14 firmly against its seat.

The coupling nut 18 is preferably formed with a plurality of faces such as indicated at 19, on its outer periphery to permit of convenient manipulation and engagement by a wrench, or like tool.

From the foregoing description of the various parts of the device, the operation thereof may be readily understood. When the delivery tubes 1 and 2 are operatively connected with suitable sources of fuel supply through the agency of the hose 4, as for instance tanks containing oxygen and acetylene, respectively, it will be obvious that the flow of the oxygen and acetylene gases along the tubes 1 and 2 may be regulated by manipulating the valves 5 to vary the proportions of the oxygen and acetylene forming the combustible mixture. It will be observed that the gases pass from the tubes 1 and 2 through the ducts 9 and 10, respectively, into the mixing chamber 11, which is in the head, and the commingling of the elements of the combustible fuel is consummated in the head and prior to the passage of such fuel into the tip, or not later than the passage of the elements of the mixture into the conoidal chamber 17 of the tip. I am thus enabled, by selecting tips having bores of different diameters, to vary my improved torch for use in service heretofore requiring the employment of a plurality of torches, each of which was designed for a particular kind of work.

Another important feature of my invention is the provision of the bell mouthed counterbore 12 for the chamber 11 and the fashioning of the enlarged rearward end portion of the tip to seat against the bottom wall of the counterbore and against the bell mouth thereof, whereby the tip is held in close contact with the head and leakage of fuel between the head and the rearward end of the tip is effectively precluded.

I claim:—

1. In a torch, a head having a socket in its rear end, a central chamber provided with a bell mouthed counterbore opening through the front end of the head, and a duct connecting the socket and the chamber, a tip having the rear end portion thereof formed to closely fit within the bell mouthed counterbore and having an axial passage extending therethrough, said passage being enlarged adjacent to the rear end of the tip to provide a conoidal chamber adapted to register at its end with the confronting end of the first named chamber, and means for maintaining the tip seated in the counterbore.

2. In a torch, a head having a central mixing chamber formed with a counterbore opening through the front end of the head, said counterbore having a bell mouth, a tip having an enlarged rear end portion fashioned to interfit the bell mouthed counterbore to closely contact the inner end, side and outer end walls of the counterbore, and means engaging the enlarged end portion of the tip and the head for holding the former clamped against the walls of the counterbore in the latter.

WILLIAM JOSEPH FRANK.